United States Patent
Tanno

(10) Patent No.: US 8,430,143 B2
(45) Date of Patent: Apr. 30, 2013

(54) PNEUMATIC TIRE

(75) Inventor: Atsushi Tanno, Hiratsuka (JP)

(73) Assignee: The Yokohama Rubber Co., Ltd. (JP)

( * ) Notice: Subject to any disclaimer, the term of this patent is extended or adjusted under 35 U.S.C. 154(b) by 287 days.

(21) Appl. No.: 12/791,530

(22) Filed: Jun. 1, 2010

(65) Prior Publication Data

US 2010/0307655 A1    Dec. 9, 2010

(30) Foreign Application Priority Data

Jun. 5, 2009  (JP) .................. 2009-136736

(51) Int. Cl.
*B60C 5/00* (2006.01)
*B60C 5/14* (2006.01)
*B60C 19/12* (2006.01)

(52) U.S. Cl.
USPC ........... 152/502; 152/155; 152/450; 152/504; 152/505; 152/507

(58) Field of Classification Search .......... None
See application file for complete search history.

(56) References Cited

U.S. PATENT DOCUMENTS

| 4,664,168 | A  | * | 5/1987  | Hong et al. | ............... 152/504 |
| 5,059,636 | A  | * | 10/1991 | Grenga      | ............... 523/166 |
| 7,607,466 | B2 | * | 10/2009 | Kim et al.  | ............... 152/502 |
| 2007/0203260 | A1 | * | 8/2007 | Okamatsu   | ............... 523/166 |

FOREIGN PATENT DOCUMENTS

| JP | 54-006206 | 1/1979 |
| JP | 2003-326926 | 11/2003 |

* cited by examiner

*Primary Examiner* — Justin Fischer
(74) *Attorney, Agent, or Firm* — Thorpe North & Western LLP

(57) ABSTRACT

A pneumatic tire including a sealant layer formed from a sealant fluid having adhesive properties that is provided on a tire inner circumferential surface corresponding with a tread portion; and a sound absorbing layer formed from a porous material that is provided via a barrier layer impermeable to the sealant fluid on an inner circumferential surface of the sealant layer; wherein a width $W_1$ of the sound absorbing layer in a tire width direction is from 50 to 90% of a width $W_2$ of the sealant layer in the tire width direction.

20 Claims, 6 Drawing Sheets

(a)

(b)

(a)

(b)

(a)

(b)

PNEUMATIC TIRE

PRIORITY CLAIM

This application is based upon and claims the benefit of priority from Japanese Patent Application No. 2009-136736, filed Jun. 5, 2009, the entire contents of which are incorporated herein by reference.

TECHNICAL FIELD

The present invention relates to a pneumatic tire and particularly relates to a pneumatic tire that is provided with both puncture seal performance and noise prevention performance.

BACKGROUND

Conventionally, many pneumatic tires are known that are provided with a sealant layer having an adhesive/fluid sealant fluid coated on an inner circumferential surface of a tread portion of a pneumatic tire. When such a tire runs over a nail or the like and is punctured, the pneumatic tire self-seals by the sealant fluid flowing into a puncture hole after the nail falls out due to centrifugal force.

However, because the sealant fluid has fluid properties, centrifugal force during high-speed running causes the sealant fluid to accumulate in a tire center region of a tread portion inner wall surface in a tire width direction, resulting in insufficient sealability in shoulder regions. This results in a problem of puncture sealing functionality not being displayed.

In order to solve such problems, pneumatic tires in which the sealant fluid is impregnated into a porous material having interconnecting cells, such as a sponge, or the like, and this porous material, into which the sealant fluid is impregnated, is attached lamellarly to an inner circumferential surface of the tread portion are proposed in the prior art. With this sort of pneumatic tire, not only is the problem of reduced puncture seal performance caused by localization of the sealant fluid in a tire center region of the tread portion during high-speed running resolved, but because the porous material having interconnecting cells has sound attenuation properties that absorb resonance noise generated in tire cavities, a benefit of noise prevention performance is also displayed.

However, regarding the noise prevention performance of the aforementioned conventional pneumatic tires, a significant amount of a cubic capacity of the interconnecting cells is blocked due to the sealant fluid being impregnated into the porous material. Therefore, noise prevention performance is not being sufficiently displayed.

SUMMARY

An object of the present invention is to resolve the aforementioned conventional problems and provide a pneumatic tire that has both superior puncture seal performance and noise prevention performance.

A pneumatic tire of the present invention that achieves the aforementioned object has a configuration as shown in the following (1).

(1) A pneumatic tire including a sealant layer formed from a sealant fluid having adhesive properties that is provided on a tire inner circumferential surface corresponding with a tread portion; and a sound absorbing layer formed from a porous material that is provided via a barrier layer impermeable to the sealant fluid on an inner circumferential surface of the sealant layer; wherein a width $W_1$ of the sound absorbing layer in a tire width direction is from 50 to 95% of a width $W_2$ of the sealant layer in the tire width direction.

More specifically, it is even better to use any of the following configurations (2) through (7) with the pneumatic tire of the present invention.

(2) The pneumatic tire according to (1), wherein the width $W_2$ of the sealant layer in the tire width direction is from 80 to 120% of a maximum width $W_3$ of a belt layer that is embedded in the tread portion.

(3) The pneumatic tire according to (1) or (2), wherein a mass per unit circumferential direction length Ms of the sealant layer and a mass per unit circumferential direction length Ma of the sound absorbing layer satisfy the following formula:

$$0.08 \leq Ma/Ms \leq 0.5$$

(4) The pneumatic tire according to any one of (1) to (3), wherein the sound absorbing layer is attached to the tire inner circumferential surface by providing an elastic reinforcing band on an inner circumferential surface or an outer circumferential surface of the sound absorbing layer.

(5) The pneumatic tire according to any one of (1) to (4), wherein the sealant layer is formed from a gel sheet having a polybutene and a terpene resin as main components.

(6) The pneumatic tire according to any one of (1) to (5), wherein, the barrier layer is formed from a resin film having a thermoplastic resin as a main component.

(7) The pneumatic tire according to any one of (1) to (6), wherein a convex extending in the tire circumferential direction is provided on at least both edges of the outer circumferential surface of the sound absorbing layer.

According to the present invention, the sealant layer is provided on the tire inner circumferential surface corresponding with the tread portion and the sound absorbing layer is provided on the inner circumferential side of the sealant layer. The sound absorbing layer has a width $W_1$ in the tire width direction that is equivalent to from 50 to 95% of the width $W_2$ of the sealant layer in the tire width direction. Therefore, during high-speed travelling, the sound absorbing layer applies outward pressure in a tire radial direction to the sealant layer due to centrifugal force. This restricts the movement of the sealant fluid to the tire center region and makes it possible to maintain excellent puncture seal performance by the sealant layer. Additionally, impregnation of the sealant fluid of the sealant layer is prevented via the barrier layer. Therefore, the porous structure of the sound absorbing layer can be maintained and excellent noise prevention performance can be displayed.

BRIEF DESCRIPTION OF THE DRAWINGS

FIG. 6a is a cross-sectional view in the tire meridian direction illustrating the sound absorbing layer, for use in the pneumatic tire of the present invention, formed from yet another embodiment; FIG. 6b is a perspective view illustrating the sound absorbing layer, for use in the pneumatic tire of the present invention, formed from the embodiment shown in FIG. 6a.

DETAILED DESCRIPTION

A detailed description will be given below of a configuration of the pneumatic tire of the present invention with reference to the drawings.

Figure 1:
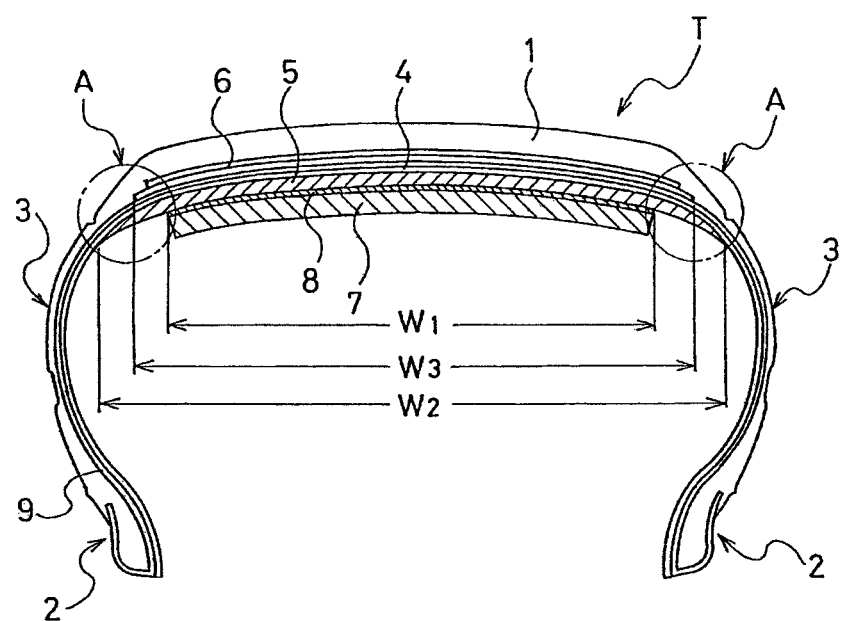
FIG. 1 is a meridian cross-sectional view showing a pneumatic tire according to an embodiment of the present invention.

FIG. 1 is a meridian cross-sectional view showing a pneumatic tire according to an embodiment of the present invention. A pneumatic tire T has sidewall portions 3,3 and bead portions 2,2 provided on left and right sides of a tread portion 1. An inner liner layer 4 is provided on a tire inner side via a carcass layer 9. A belt layer 6 is provided on an outer circumferential side of the carcass layer 9. Additionally a sealant layer 5 being coated with an adhesive/fluid sealant fluid is provided in a region of a tire inside surface corresponding to the tread portion 1. A sound absorbing layer 7 formed from a porous material is provided on an inner side of the sealant layer 5 via a barrier layer 8 that does not allow permeation of the sealant fluid.

As a result of this configuration, the pneumatic tire of the present invention can prevent the sealant fluid from accumulating in a tire center region in a tire width direction and maintain the sealant fluid in a region of a vicinity of both edges (region "A" in FIG. 1) due to centrifugal force during high-speed running causing the sound absorbing layer 7 to be pressed against the sealant layer 5 towards a tire outer side. Additionally, the sound absorbing layer 7 is provided with the barrier layer 8 on the outer circumferential side. Therefore, the sealant fluid does not permeate into the porous material and a cubic capacity of the porous material is maintained. As a result, the porous material can display its intended sound absorbing functions.

In order to ensure operational effects of the sound absorbing layer 7, it is necessary to provide the sound absorbing layer 7 with a width $W_1$ in the tire width direction that is from 50 to 95% of a width $W_2$ of the sealant layer 5. Furthermore, preferably the width $W_1$ of the sound absorbing layer 7 in the tire width direction is from 70 to 92% of the width $W_2$ of the sealant layer 5. If the width $W_1$ of the sound absorbing layer 7 in the tire width direction is less than 50% of the width $W_2$ of the sealant layer 5, centrifugal force exerted by the sound absorbing layer 7 will become localized against the sealant layer 5. This will result in the sealant fluid not being able to be maintained in shoulder regions. Additionally, if the width $W_1$ of the sound absorbing layer 7 in the tire width direction is more than 95% of the width $W_2$ of the sealant layer 5, the effect will be saturation, but will cause an increase in weight of an entirety of a tire. Therefore, this is not preferable.

Additionally, from a perspective of excellently displaying a self-sealing performance of punctures that occur by the tread portion 1 running over nails and the like, the width $W_2$ of the sealant layer 5 is preferably from 80 to 120% of a maximum width $W_3$ of the belt layer 6 embedded in the tread portion 1.

In order to effectively make the pressing force on the sealant layer 5 by the sound absorbing layer 7 due to centrifugal force during running operate, a mass per unit circumferential direction length Ms of the sealant layer 5 and a mass per unit circumferential direction length Ma of the sound absorbing layer 7 preferably satisfy the following formula (a) and more preferably satisfy the following formula (b).

$$0.08 \leq Ma/Ms \leq 0.5 \qquad (a)$$

$$0.1 \leq Ma/Ms \leq 0.3 \qquad (b)$$

The sound absorbing layer 7 is not particularly limited, but using a material that has a porous structure having interconnecting cells is preferable. For example, using polyurethane foam is optimal. Additionally, an unwoven mat having a multiplicity of randomly bunched fibers and the like can also be used.

A shape of the sound absorbing layer 7, that is, a cross-sectional shape in a tire meridian direction, in general, may be a rectangular shape as illustrated in FIG. 1. Additionally, a movement due to centrifugal force of the sealant fluid of the sealant layer 5 differs depending on an aspect ratio and a profile of a tire. Therefore, taking this into account, modified forms of the shape of the sound absorbing layer 7 such as those illustrated in FIG. 2a and FIG. 2b may also be used.

Figure 2:
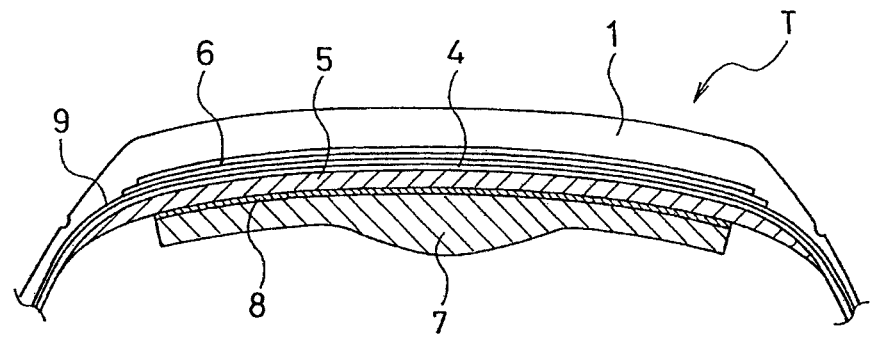
FIGS. 2a and 2b are each cross-sectional views in the tire meridian direction showing other embodiments of a pneumatic tire of the present invention.
Figure 2:
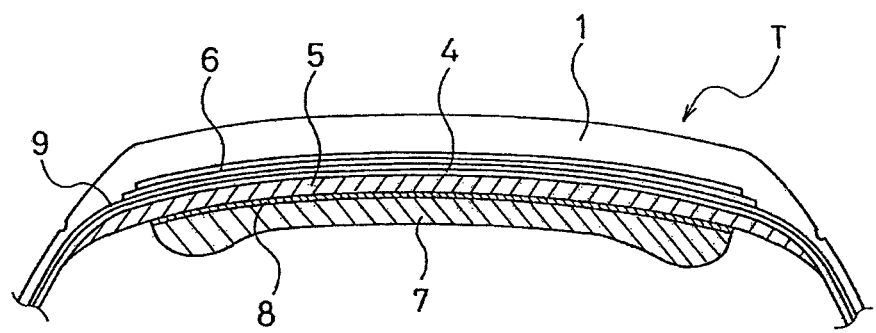

The sound absorbing layer 7 illustrated in FIG. 2a is expanded such that a tire center region is substantially spindle-shaped. Such a shape effectively stops a forceful movement of the sealant fluid toward a tire center region that occurs in low aspect ratio tires and the like. The sound absorbing layer 7 illustrated in FIG. 2b is expanded such that vicinities of both edges of the sound absorbing layer 7 in the tire width direction are substantially spindle-shaped. Particularly, in tires such as those where a radius of a tread profile is small, such a shape exhibits great effects in suppressing movement of the sealant fluid of the regions in the vicinities of both edges of the sealant layer 5 in the tire width direction (for example, region "A" in FIG. 1) toward the tire center region.

Figure 3:
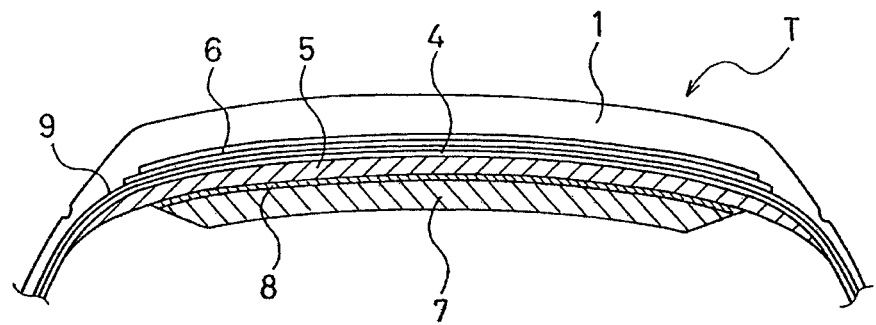
FIGS. 3a and 3b are each cross-sectional views in the tire meridian direction showing other embodiments of a pneumatic tire of the present invention.
Figure 3:
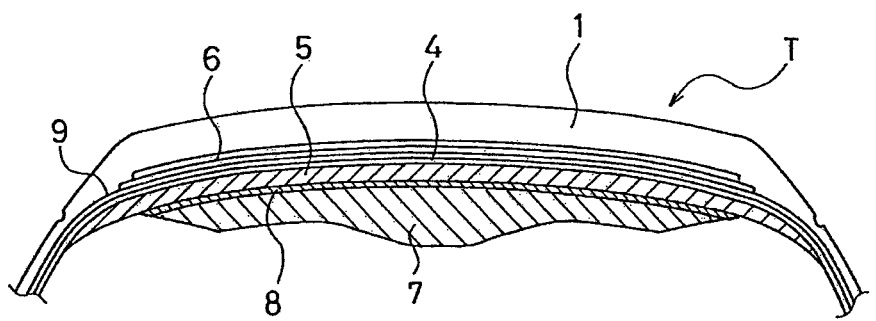

Additionally, in order to prevent damage from being caused by a lever being caught on an edge of the sound absorbing layer 7 when using a tire changer to switch tires, modified forms of the sound absorbing layer 7 in which a thickness of the edges is gradually reduced, as illustrated in FIG. 3a and FIG. 3b, may also be used.

The sound absorbing layer 7 illustrated in FIG. 3a is a modification of the rectangular shape cross-section in the tire meridian direction illustrated in FIG. 1, in which the thickness of the edges of the sound absorbing layer 7 is gradually reduced. The sound absorbing layer 7 illustrated in FIG. 3b is a modification of the sound absorbing layer 7 illustrated in FIG. 2a, in which the tire center region is expanded so as to be substantially spindle-shaped and the thickness of the edges is gradually reduced.

FIGS. 4a to 4d are perspective views illustrating the sound absorbing layer 7 provided with the barrier layer 8.

Figure 4:
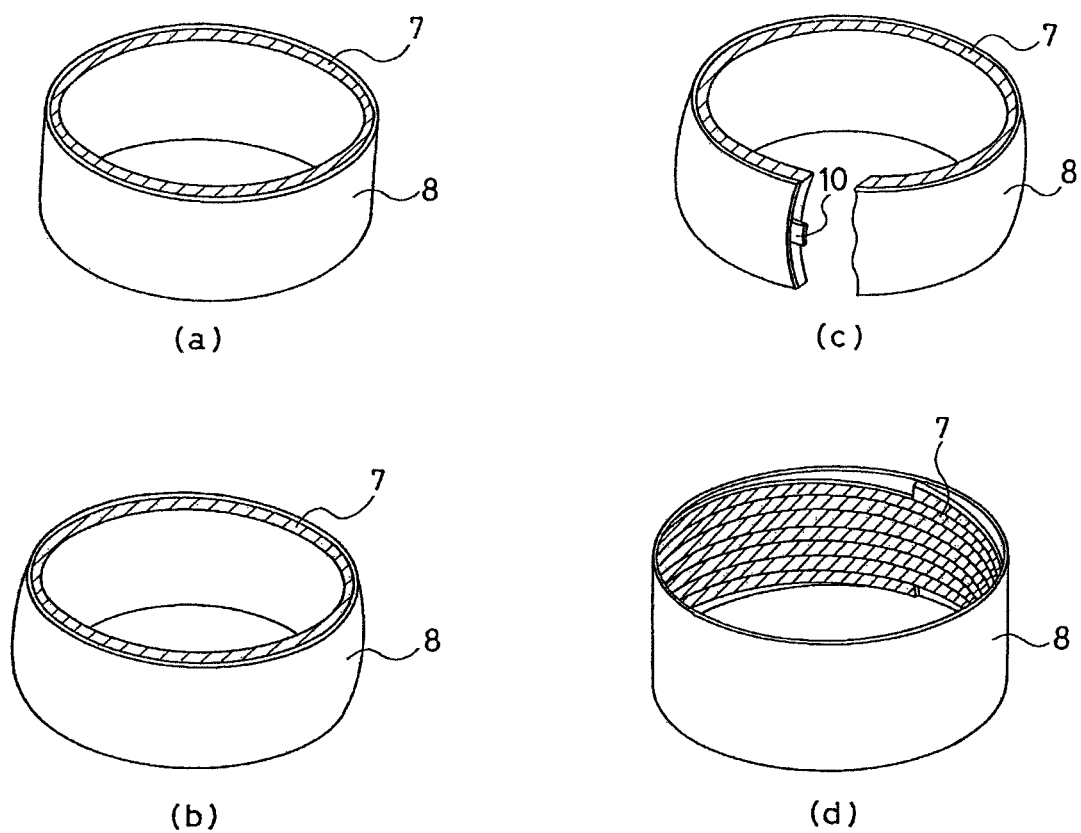
FIGS. 4a to 4d are each perspective views illustrating embodiments of the sound absorbing layer for use in the pneumatic tire of the present invention.

In an embodiment illustrated by FIG. 4a, the rectangular cross-section of the sound absorbing layer 7 is formed into a cylindrical shape, and the barrier layer 8 is laminated on an outer periphery of the sound absorbing layer 7 so as to be integrated therewith. Additionally, in an embodiment illustrated by FIG. 4b, the sound absorbing layer 7 is likewise formed into a cylindrical shape, but has a profile in which the outer periphery is expanded so as to be barrel-shaped while the outer circumferential surface has a maximum diameter of a tire equatorial portion. Fitting the sound absorbing layer 7 on an inner circumferential side of the pneumatic tire T can be done more easily by using a profile in which sound absorbing layer 7 is expanded into such a barrel-shape.

In an embodiment illustrated by FIG. 4c, an elastic reinforcing band 10 is attached to an entire outer circumferential surface of the sound absorbing layer 7 being formed into a cylindrical shape. By using such a configuration, an elastic force of the elastic reinforcing band 10 will act on the tire inside surface and the sound absorbing layer 7 can be firmly supported on the tire inside surface. The elastic reinforcing band 10 may also be provided along an entire circumference of the inner circumferential surface of the sound absorbing layer 7 being formed into a cylindrical shape.

In an embodiment illustrated by FIG. 4d, an annular sound absorbing layer 7 is formed by wrapping a band-shaped porous material multiple times in a spiral in a tire circumferential direction. It is favorable that the band-shaped porous material of such a configuration has a width of from 10 to 60 mm, preferably from 15 to 45 mm, and a thickness of from 10 to 30 mm. Additionally, it is favorable that a spacing between adjacent edges in the width direction when wrapping the band-shaped porous material in a spiral be in a range from 1 to 50 mm, and preferably from 2 to 30 mm. By providing such spacing, abrasive wear caused by contact between the porous materials can be suppressed.

The barrier layer 8 is used to prevent impregnation of the sealant fluid into the sound absorbing layer 7. Therefore, the barrier layer 8 should have impermeability with respect to the sealant fluid.

Preferably, the barrier layer 8 is formed from a resin film having a thermoplastic resin as a main component. Of such, a resin film formed from a thermoplastic elastomer composition having an elastomer dispersed in a thermoplastic resin is preferable.

Formation of the barrier layer 8 is not particularly limited, but it is favorable to form a sheet-like product, such as a film or the like, of the resin composition having a thermoplastic resin as a main component; attach the sheet-like product to the outer side of the sound absorbing layer 7; and use an adhesive or a process such as thermal bonding, or the like, to bond both edges thereof together. Alternatively, the resin composition may be formed into a tubular shape; applied to a contour of the sound absorbing layer 7; and heat shrunk by heating, or the like, to adhere it thereto.

Figure 5:
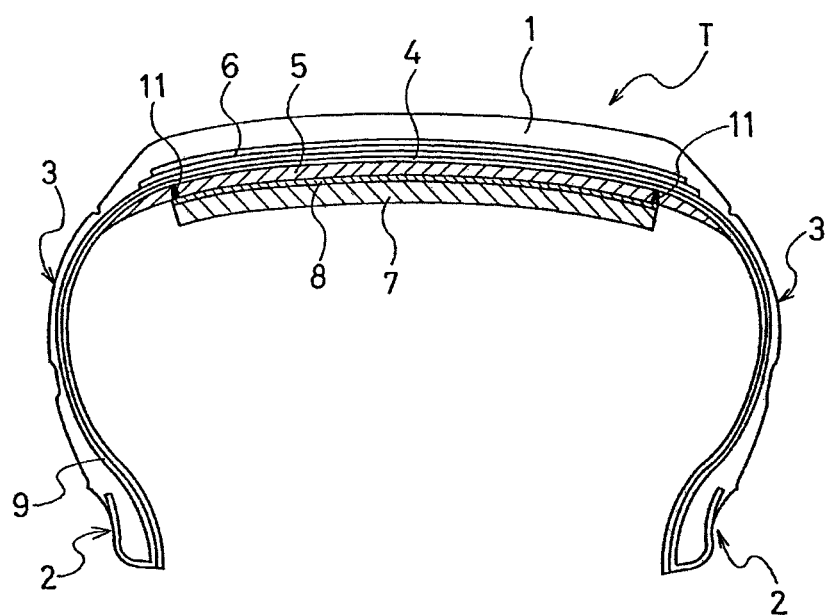
FIG. 5 is a meridian cross-sectional view showing a pneumatic tire according to another embodiment of the present invention.

FIG. 5 is another embodiment of the present invention.

Figure 6:
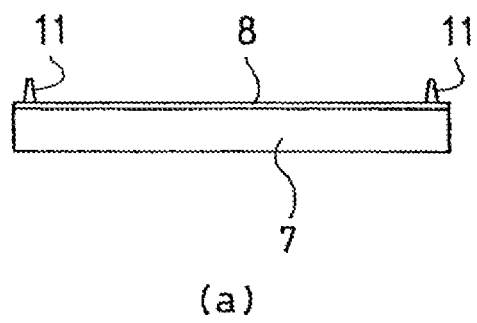
Figure 6:
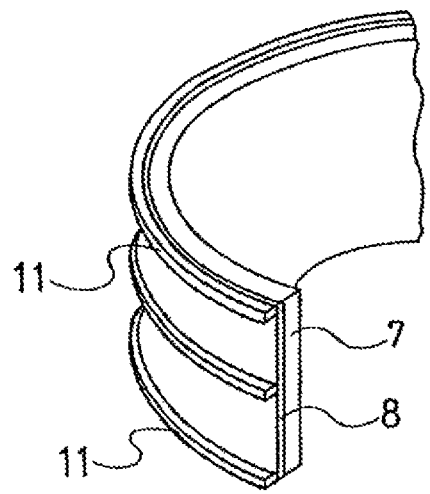

In a pneumatic tire illustrated in FIG. 5, the sound absorbing layer 7 is provided with a convex 11, continuously extending in the tire circumferential direction, on at least both edges of the outer circumferential surface in the tire width direction. By providing such a convex 11, when centrifugal force is exerted, movement of the sealant fluid of the regions in the vicinities of both edges of the sealant layer 5 in the tire width direction (region "A" in FIG. 1) toward the tire center region can be suppressed. As illustrated in FIG. 6a, the convexes 11 may have pointed ends. Also, as illustrated in FIG. 6b, the convexes 11 may be provided in a vicinity of the tire center region in addition to both edges of the sound absorbing layer 7.

The sealant fluid of the sealant layer 5 is not particularly limited so long as it is a fluid having adhesive properties. Any conventionally known sealant agent for use in puncture sealing can be used. For example, forming the sealant layer 5 from a gel sheet having a polybutene and a terpene resin as main components will result in low fluidity and therefore is preferable. Alternatively, a silicone based compound, a urethane based compound, a styrene based compound, or an ethylene based compound may be used.

The sealant layer 5 formed from the gel sheet, or the like, can be easily installed on the inner circumferential surface of the tread portion after a tire is formed and therefore is preferable.

Examples

A pneumatic tire for example 1 of the present invention was formed having a tire size of 195/65R15 ES300; a tire structure according to FIG. 1; a tire inner circumferential length of 1,887 mm; a maximum width $W_3$ of a belt layer of 165 mm; a width $W_2$ of a sealant layer of 160 mm (thickness of 3.5 mm, mass of 750 g); and a width $W_1$ of a sound absorbing layer of 130 mm (thickness of 15 mm, mass of 100 g).

A polyurethane foam having interconnecting cells was used as the sound absorbing layer of the pneumatic tire of example 1 and a barrier layer having a thickness of 0.1 mm formed from a thermoplastic elastomer resin film was provided on an outer side of the sound absorbing layer. Additionally, a mass per unit circumferential direction length Ms of the sealant layer and a mass per unit circumferential direction length Ma of the sound absorbing layer were set to satisfy the formula: Ma/Ms=0.13.

A pneumatic tire identical to the pneumatic tire for example 1, only being not provided with the sound absorbing layer and the barrier layer was manufactured as a pneumatic tire for comparative example 1.

The test tires for example 1 and comparative example 1 were mounted on a passenger vehicle having a displacement of 2,000 cc. After continuous running for two hours at 100 km/hr, thicknesses of the sealant layer in tire center regions and shoulder portions were measured for each test tire and evaluated using an index in which a thickness of the sealant layer before running is 100. Results are shown in Table 1.

Additionally, noise levels in the vehicle cabin during the test running were measured, and values for ⅓ octave bands with a frequency of 250 Hz were recorded.

Results are shown in Table 1.

It is clear that differences in the shoulder regions and center regions of the sealant layer of the tire of example 1 are significantly smaller than in the tire of comparative example 1. Moreover, it is clear that the vehicle noise is improved.

TABLE 1

|  | Sealant localization (index) | | |
| --- | --- | --- | --- |
|  | Tire shoulder region | Tire center region | Noise prevention performance |
| Comparative Example 1 | 23 | 112 | 65.2 (db) |
| Example 1 | 92 | 101 | 62.6 (db) |

What is claimed is:

1. A pneumatic tire comprising:
    a sealant layer formed from an adhesive sealant fluid being provided on a tire inner circumferential surface corresponding with a tread portion; and
    a sound absorbing layer formed from a porous material having interconnecting cells being provided via a barrier layer impermeable to the sealant fluid on an inner circumferential surface of the sealant layer, the sealant layer and the sound absorbing layer being completely insulated from one another by the barrier layer;
    wherein a width $W_1$ of the sound absorbing layer in a tire width direction is from 50 to 95% of a width $W_2$ of the sealant layer in the tire width direction.

2. The pneumatic tire according to claim 1, wherein the width $W_2$ of the sealant layer in the tire width direction is from 80 to 120% of a maximum width $W_3$ of a belt layer that is embedded in the tread portion.

3. The pneumatic tire according to claim 2, wherein a mass per unit circumferential direction length Ms of the sealant layer and a mass per unit circumferential direction length Ma of the sound absorbing layer satisfy the following formula:

$$0.08 \leq Ma/Ms \leq 0.5.$$

4. The pneumatic tire according to claim 1, wherein a mass per unit circumferential direction length Ms of the sealant layer and a mass per unit circumferential direction length Ma of the sound absorbing layer satisfy the following formula:

$0.08 \leq Ma/Ms \leq 0.5$.

5. The pneumatic tire according to claim 4, wherein the mass per unit circumferential direction length Ms of the sealant layer and the mass per unit circumferential direction length Ma of the sound absorbing layer satisfy the following formula:

$0.1 \leq Ma/Ms \leq 0.3$.

6. The pneumatic tire according to claim 4, wherein the sound absorbing layer is attached to the tire inner circumferential surface by providing an elastic reinforcing band on an inner circumferential surface or an outer circumferential surface of the sound absorbing layer.

7. The pneumatic tire according to claim 1, wherein the sound absorbing layer is attached to the tire inner circumferential surface by providing an elastic reinforcing band on an inner circumferential surface or an outer circumferential surface of the sound absorbing layer.

8. The pneumatic tire according to claim 7, wherein the sealant layer is formed from a gel sheet having a polybutene and a terpene resin as main components.

9. The pneumatic tire according to claim 1, wherein the sealant layer is formed from a gel sheet having a polybutene and a terpene resin as main components.

10. The pneumatic tire according to claim 9, wherein a convex extending in a tire circumferential direction is provided on at least both edges of the outer circumferential surface of the sound absorbing layer.

11. The pneumatic tire according to claim 1, wherein, the barrier layer is formed from a resin film having a thermoplastic resin as a main component.

12. The pneumatic tire according to claim 1, wherein a convex extending in a tire circumferential direction is provided on at least both edges of the outer circumferential surface of the sound absorbing layer.

13. The pneumatic tire according to claim 1, wherein the width $W_1$ of the sound absorbing layer in a tire width direction is from 70 to 92% of the width $W_2$ of the sealant layer in the tire width direction.

14. The pneumatic tire according to claim 1, wherein the porous material comprises a width of from 10 to 60 mm.

15. The pneumatic tire according to claim 14, wherein the porous material comprises a width of from 15 to 45 mm and a thickness of from 10 to 30 mm.

16. The pneumatic tire according to claim 1, wherein the sound absorbing layer comprises an annular sound absorbing layer formed by wrapping the porous material multiple times in a spiral in a tire circumferential direction.

17. The pneumatic tire according to claim 16, wherein a spacing between adjacent edges of the porous material in the width direction in the spiral ranges from 1 to 50 mm.

18. The pneumatic tire according to claim 17, wherein the spacing between adjacent edges of the porous material in the width direction in the spiral ranges from 2 to 30 mm.

19. The pneumatic tire according to claim 1, wherein the barrier layer comprises a resin film formed from a thermoplastic elastomer composition having an elastomer dispersed in a thermoplastic resin.

20. The pneumatic tire according to claim 1, wherein the sealant layer comprises a silicone based compound, a urethane based compound, a styrene based compound, or an ethylene based compound.

* * * * *